United States Patent [19]

Suman

[11] 4,311,314

[45] Jan. 19, 1982

[54] WELL PACKER

[76] Inventor: George O. Suman, 5420 Huckleberry La., Houston, Tex. 77056

[21] Appl. No.: 208,823

[22] Filed: Nov. 20, 1980

[51] Int. Cl.³ .............................................. F16L 33/16
[52] U.S. Cl. ...................................... 277/34; 166/187
[58] Field of Search ................. 166/179, 187; 277/9.5, 277/34, 34.3, 34.6

[56] References Cited

U.S. PATENT DOCUMENTS

| 2,896,724 | 7/1959 | Baker | 277/9.5 |
| 3,351,349 | 11/1967 | Chenoweth | 277/34 |
| 3,604,732 | 9/1971 | Malone | 277/34 |
| 3,837,947 | 9/1974 | Malone | 277/34 |

Primary Examiner—Robert I. Smith

[57] ABSTRACT

An inflatable packer is disclosed for use in oil and gas wells, the packer having means to prevent the inflatable member from becoming affixed to the borehole wall and tear or be accidentally set.

3 Claims, 3 Drawing Figures

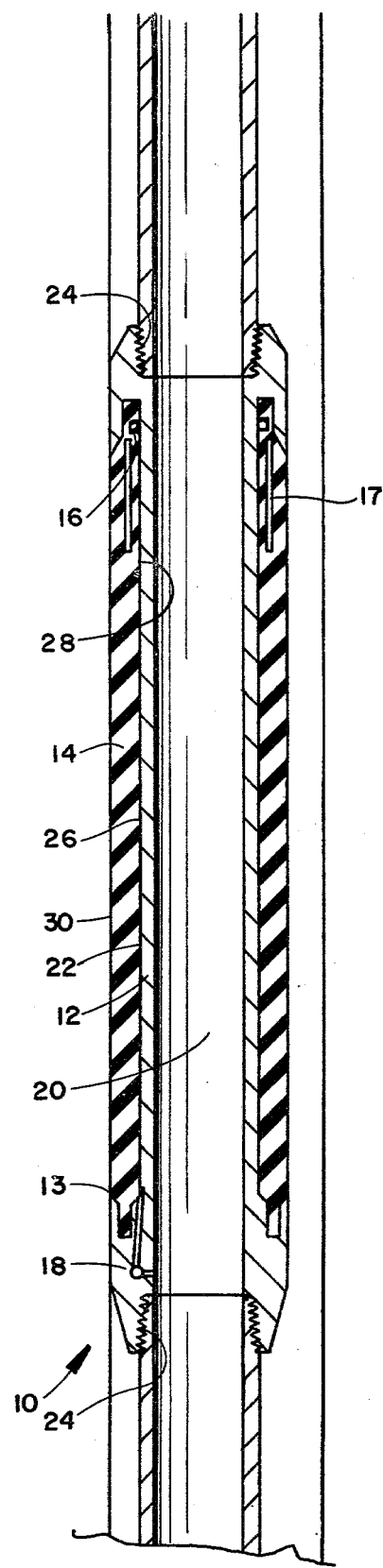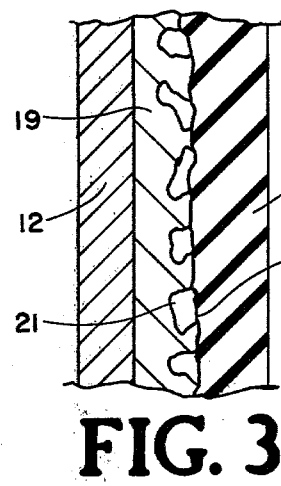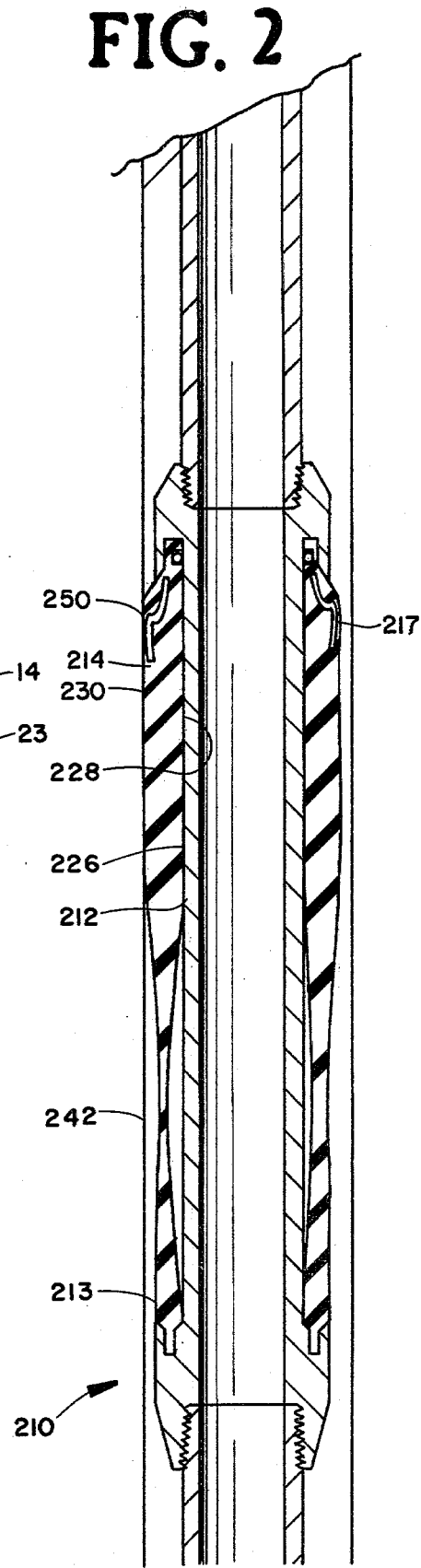

WELL PACKER

FIELD OF THE INVENTION

The present invention generally relates to packers used during drilling or production of oil and gas wells for the purpose of providing annular seals between the outside of the pipe string and the surrounding surface such as the borehole wall or the inner surface of a larger pipe. More particularly, the present invention relates to inflatable packers, having inflatable sleeves usually of 5'-40' in length for inflation by means of a cement slurry.

BACKGROUND OF THE INVENTION

Inflatable rubber sleeve type packers have been used for many years in relatively short lengths. The sleeve of these packers has reinforcing ribs which extend continuously along the length of the sleeve which, among other things, prevent portions of the sleeve from moving axially along its supporting mandrel. However, longer versions of these packers do not have continuous ribs in their sleeves resulting in a tendency of the sleeve to move axially along the mandrel while being run into a well resulting in a failure of the sleeve and therefore loss of the sealing and anchoring ability of the packer. Such a loss may require the retrieval of the pipe string upon which the packer has been run, which in turn causes expensive and dangerous delays in the drilling and completion of high pressure oil and gas wells.

Movement of the sleeve axially along the mandrel, before inflation of the sleeve, may be caused by any one of several factors: the pipe string upon which the packer is run may have moved laterally against the side of the borehole; the borehole may not be straight, causing contact of the pipe string with the borehole at three or more levels; the borehole may have cuttings stacked within it so as to force the pipe string to contact the borehole wall; the pipe may be in compression at the packer level and thereby cause the pipe to buckle and to contact the borehole wall. Any one of the above factors, when occuring at a level so as to cause the packer sleeve to be forced against the borehole wall, may cause relative axial movement between the mandrel and the sleeve of the prior art, before the sleeve is inflated. Such axial movement of the sleeve relative to the mandrel has in the past caused the sleeve to tear away from its upper attachment to the mandrel and thereby has prevented the sleeve from providing the intended functions of sealing and anchoring against the borehole. The tendency for a long sleeve to slide along the mandrel is greater than for a short sleeve because of the longer length of contact between the sleeve and the borehole and also because it lacks the continuous ribs found in the short sleeves. It will be appreciated that when a sleeve is forced against the borehole wall and the pipe string is lowered, a tendency for relative movement between the sleeve and the mandrel exists, and that if the mandrel within the sleeve has a smooth outer surface according to the prior art, the borehole wall along the length of the sleeve may easily cooperate with the sleeve, to develop a greater bond than the frictional resistance between the sleeve and the smooth mandrel and thereby cause the sleeve to hold to the borehole wall while the mandrel slides along the sleeve to result in failure of the sleeve. It will also be appreciated that if the exterior surface of the mandrel is made of sufficient roughness according to the present invention, that the frictional bond between the mandrel and the sleeve, before inflation of the sleeve, can be made sufficiently strong so as to cause the sleeve to move along the borehole wall regardless of the sleeve length, which in turn prevents rupture of the sleeve as described above, to preserve the sealing and anchoring capability of the packer.

Therefore, features of the present invention are to:

Provide an inflatable packer sufficiently strong so as to withstand without damage, positioning operations prior to inflation of the packer;

Provide means to prevent rupture of the sleeve of an inflatable packer caused by axial forces thereon;

Provide means to reduce the tendency for relative axial movement between the sleeve and the mandrel before inflation of the sleeve.

Provide a mandrel having an outer surface of increased roughness.

SUMMARY OF THE INSTANT INVENTION

The present invention comprises: an inflatable packer having an inflatable elastic sleeve mounted around a tubular mandrel of metal or the like so as to seal the annulus formed between the mandrel and the borehole within which the packer is run and to anchor the mandrel to the borehole wall; the outer surface of the mandrel being made of sufficient roughness such that when the mandrel presses the sleeve against the borehole wall prior to inflation of the sleeve and the mandrel is lowered; the sleeve moves with the mandrel and slides along the borehole wall to prevent rupture of the sleeve.

BRIEF DESCRIPTION OF THE DRAWINGS

FIG. 1 illustrates a packer constructed in accord with the present invention moving vertically when in contact with the borehole wall.

FIG. 2 illustrates a packer constructed in accord with prior art, moving downwardly while in contact with the borehole wall.

FIG. 3 is an enlarged fragmentary view taken from FIG. 1 so as to show particles of sand bonded to the mandrel.

DESCRIPTION OF THE PREFERRED EMBODIMENT

The packer shown generally at 10 of FIG. 1 depicts: tubular mandrel 12 made of metal or the like; tubular sleeve 14 made of a suitable elastomer for use in an oil well and positioned around mandrel 12 and sealingly affixed to mandrel 12 as at 13; seal 16 positioned within the upper end of sleeve 14 so as to provide a fluid seal between sleeve 14 and mandrel 12 as the upper end of the sleeve slides along the mandrel; port 18 to provide for the communication of fluid from bore 20 of mandrel 12 into the annular space 22 formed between the mandrel and sleeve when the packer is inflated. Formed in the top and bottom of mandrel 12 are attachment means as at 24 for the attachment of the pipe string above and below the packer. Of particular interest is surface 26 of mandrel 12 which is intentionally formed to be rough so as to prevent inner surface 28 of sleeve 14 from sliding in contact with surface 26 of mandrel 12. Thus, when the packer is being lowered while in contact with the borehole wall as at 30, rough surface 26 will indent into the elastomer of which the sleeve 14 is made and will move sleeve 14 along with mandrel 12. Ribs 17, made of metal or the like are positioned within the upper end of sleeve 14 around and parallel to mandrel 12 so as to afford sleeve 15 support between the mandrel and the borehole during and after inflation of sleeve 14.

FIG. 2 depicts the problem that can occur when packers are used without benefit of the present invention. Whenever packer 210 is lowered while in contact with the borehole wall as at 230, smooth surface 226 of mandrel 212 slides along the inner surface 228 of sleeve 214, that portion of sleeve 214 in contact with the borehole wall remaining stationary while the lower end 213 of sleeve 214 is pulled down to thereby stretch sleeve 214 severely as at 242, which in turn allows the upper end of sleeve 214 as at 250 to be radially expanded. Ribs 217 are thereby severely distorted so as to become useless for supporting the sleeve as described above.

Surface 26 may be formed suitably rough by bonding solid grit-like particles (sand, metal or the like) to the mandrel surface by a suitable binder such as an epoxy resin. Thus as shown in FIG. 3 the surface 26 is coated with epoxy resin 19 having particles of sand 21 mixed within or added thereto, and allowing the epoxy to harden so as to provide a sandpaper-like roughness to indent the elastomer of the sleeve 14 as at 23 and to cause the sleeve to move vertically with mandrel 12 and to thereby prevent damage to the upper portion of sleeve 14 or to ribs 17.

During the manufacture of the packer, the sleeve may be laid up on the mandrel and then cured in place. To avoid the rubber bonding to the gritted coating, a suitable mold release agent, such as a powdered limestone aqueous paste, can be applied to the mandrel coating. This coating, after the rubber is cured, can be removed by a suitable solvent (e.g. HCl acid) wash followed by neutralization of any residual acid by a suitable base such as sodium bicarbonate.

Heretofore, grit coatings described above have been applied to the outer surface of casing strings in an attempt to improve the cement bond with the casing. However, the grit coating is exposed to drilling mud when the casing is run into the well and becomes impregnated with a mud cake which prevents good contact between the grit coating and the cement. With the instant invention, the rubber sleeve extends around the grit coated mandrel and isolates it from the mud in the well. Accordingly when the packer is inflated with cement, the latter comes into contact with clean grit coating and can make a better bond to it. This in turn improves the anchoring capability of the packer in that the strength of the cement-mandrel bond is improved and the anchor is less likely to slide or turn in the cement surrounding it.

Other embodiments of the present invention will become obvious to those skilled in the art, upon practice thereof.

It is therfore clear that the present invention is well suited to provide the advantages and features disclosed herein.

What is claimed is:

1. An inflatable packer for use within the borehole of an oil well comprising: a centrally disposed tubular mandrel provided with end means for sealably attaching to a string of pipe; a tubular sleeve formed from a suitable elastomer and positioned around the mandrel, the mandrel extending out of the ends of the sleeve; the ends of the sleeve being sealably attached to the periphery of the mandrel; the sleeve having a first position wherein the sleeve inner surface is in contact with the outer surface of the mandrel; means to inflate the sleeve so as to expand the sleeve to a second position so as to seal the sleeve against the borehole; the outer surface of the mandrel in contact with the sleeve when the sleeve is in the first position, being provided with a coating of grit-like particles bonded to said outer surface to prevent the sleeve from sliding axially along the mandrel when the sleeve is in the first position.

2. The invention of claim 1 further comprising, said grit-like particles being sand.

3. The invention of claim 2 wherein said sand is bonded to said outer surface by an epoxy resin.

* * * * *